United States Patent Office 2,925,740
Patented Feb. 23, 1960

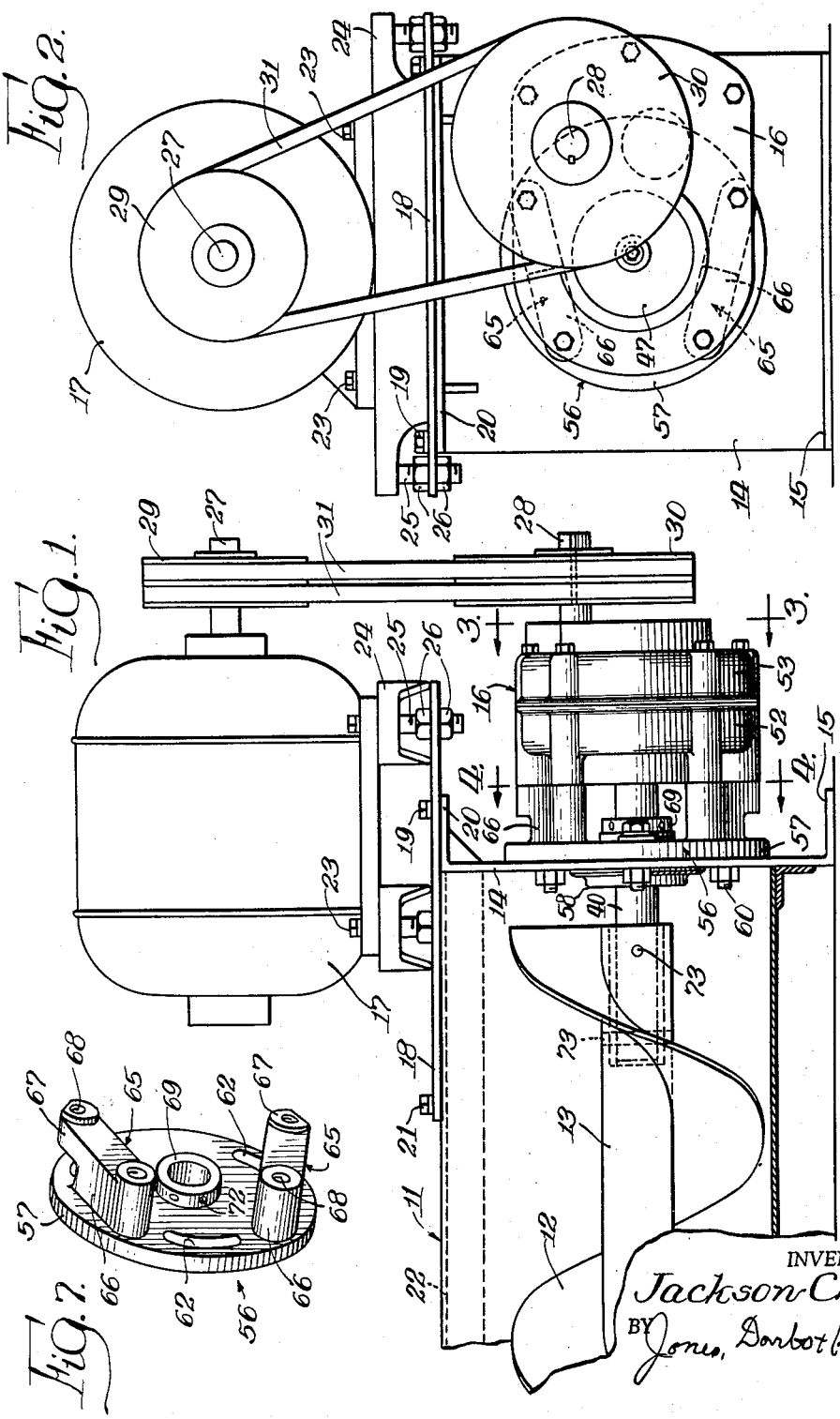

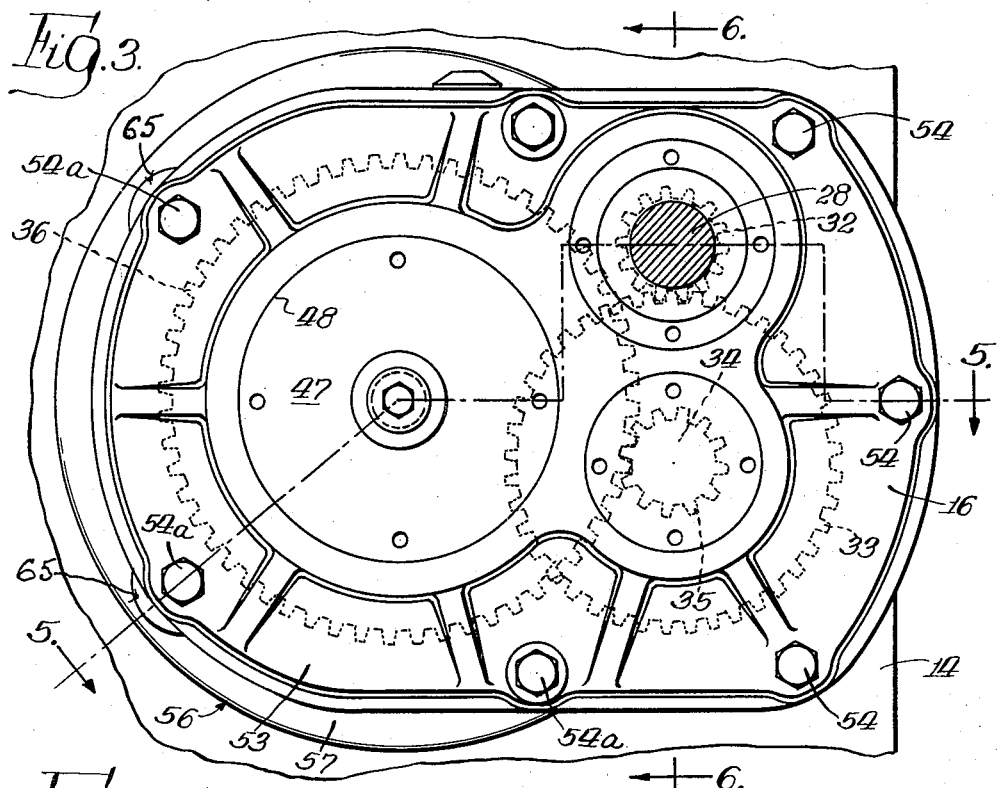
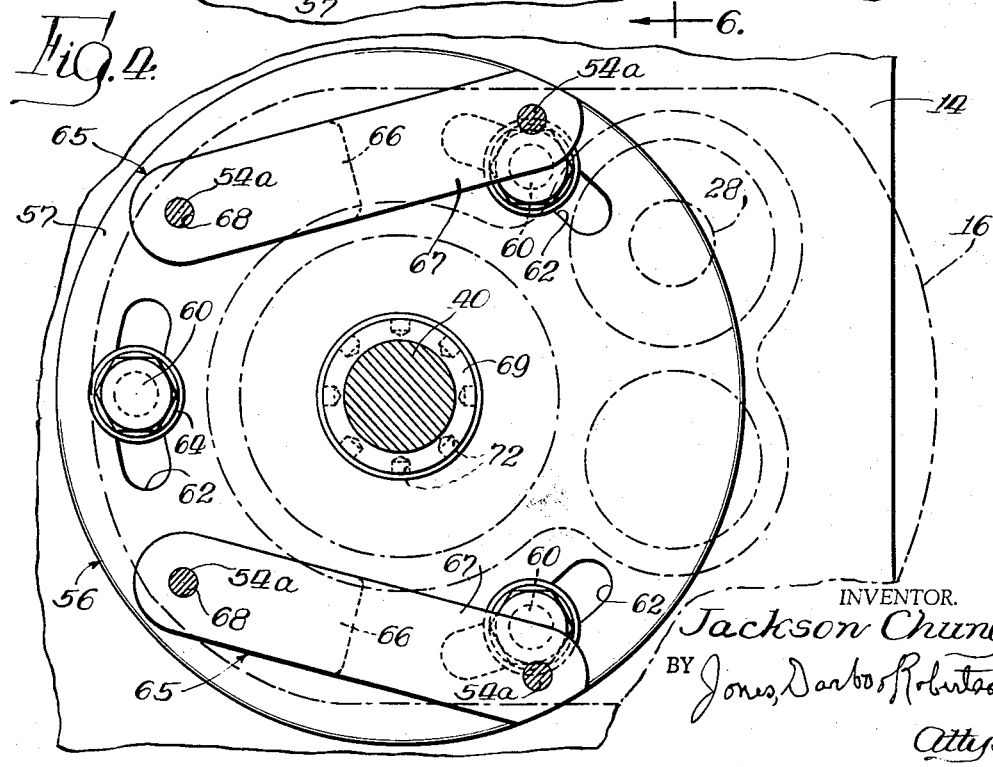

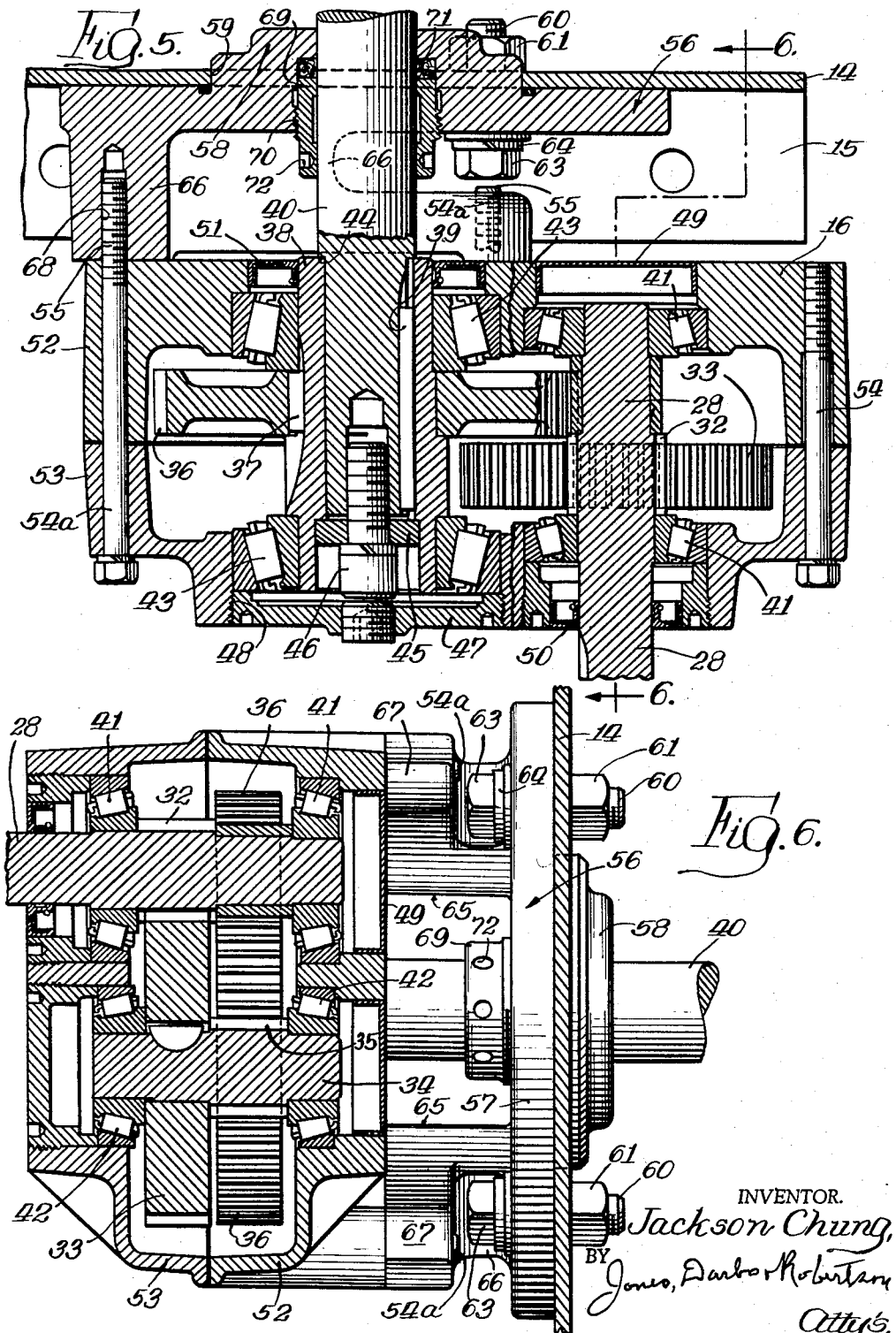

2,925,740

MOUNTING MEANS FOR POWER TRANSMISSION UNIT

Jackson Chung, Mishawaka, Ind., assignor to Dodge Manufacturing Corporation, Mishawaka, Ind., a corporation of Indiana Application July 8, 1957, Serial No. 670,599

8 Claims. (Cl. 74—242.13)

This invention relates to mounting means for power transmission unit, more particularly of the type including a speed reducer device having relatively offset input and output shafts and associated gearing, the input shaft being belt driven from a separate motor and the device being rotatable on the axis of the output shaft to provide adjustment for the drive belt, the motor and speed reducer being advantageously carried on a common mounting.

In Firth Patent No. 2,606,453 there is shown and claimed common mounting means for a motor and a speed reducer device belt-driven from the motor, the speed reducer being rotatable with respect to the shaft to be driven but being selectively rigidly secured to the common mounting against rotation, whereby jerking of the power input shaft by the motor in starting under a heavy inertia load is prevented from causing momentary dislocation or misalignment of said driven shaft by lifting or displacement thereof in its bearings. The present invention is an improvement on the disclosure of said Firth patent in that it provides further adaptability for the purposes described and particularly enhanced efficiency from the standpoint of maintenance and repair.

In an important aspect, the invention contemplates an adapter member which may be independently attached to a mounting plate, on which the motor is also supported, and as to which adapter member the speed reducer device may be readily attached or detached without dismounting the adapter member, the adapter member being capable of selectively limited rotative adjustment on the mounting plate for the purpose referred to.

In a further aspect, the invention provides that the adapter member carries a packing gland for the speed reducer output shaft that is readily accessible for service and maintenance, when the speed reducer device is detached from the adapter, the speed reducer output shaft being at the same time readily detachable from the shaft to be driven, for observation or repair.

The foregoing, and other objects and advantages, will be apparent from the following description, taken together with the accompanying drawings, of an illustrative embodiment of the invention, and in which drawings—

Figure 1 is a side elevational view of a mounting means for a power transmission unit embodying the present invention, in this instance for a screw conveyor;

Figure 2 is a front elevational view of the same;

Figure 3 is an enlarged phantom elevational view or section taken on the line 3—3 of Fig. 1;

Figure 4 is a front elevational view, on the scale of Fig. 3, of the adapter member as shown in Figs. 1 and 2, and being a section taken on the line 4—4 of Fig. 1, the speed reducer unit being schematically indicated in broken lines;

Figure 5 is a plan section taken on the irregular line 5—5 of Fig. 3;

Figure 6 is a vertical section on the line 6—6 of Fig. 3 and also on line 6—6 of Fig. 5; and Figure 7 is a perspective view of the adapter member shown in the other figures.

One of the serious objections to prior expedients for the purposes here described, including those of said Firth patent and others, has been the difficulty of access to the bearing of the speed reducer output shaft and its connection to the shaft to be driven, as well as the necessity of providing special features in either the mounting plate or the speed reducer casing, or both, for relatively mounting the speed reducer on the plate relative to the motor. These objections are overcome by the expedients of the present invention as next described.

Referring in detail to the illustrative construction shown in the drawings, the numeral 11 indicates in general a trough for a screw conveyor 12 that includes a driven shaft 13. One end 14 of the trough 11 provides both a support for that end of the trough as by having the flanged base 15 that may be secured to a floor or the like and that also provides, as described in said Firth patent, a mounting plate for power transmission means for driving the screw conveyor 12. As here shown, such power transmission means includes a speed reducer unit having a casing 16 and an electric motor 17, the motor being shown mounted on a platform 18 that is secured by bolts 19 to the top flange 20 of the mounting plate 14 and other bolts 21 that may pass through the side flanges 22 of the trough 11. The motor casing is here illustrated secured by bolts 23 that engage rails 24 that are secured by studs 25 and nuts 26 to the platform 18, as seen in Figs. 1 and 2. The motor armature shaft 27 drives the power input shaft 28 of the speed reducer 16 by pulley 29 affixed on the motor shaft 27 and pulley 30 affixed on the speed reducer input shaft 28, about which pulleys are entrained belt drives 31.

The speed reducer input shaft 28 has a pinion 32 thereon (Fig. 3) within the casing 16 that drives the enlarged gear 33 fixed on an intermediate shaft 34 of the speed reducer, the latter in turn carrying a pinion 35 that drives a still larger gear 36 that in turn is keyed as at 37 to a bushing 38 that is keyed as at 39 to the speed reducer output shaft 40, the usual anti-friction roller bearings, which form no part of the present invention, being shown in Figs. 5 and 6. For example, roller bearings 41 between suitable inner and outer races carry input shaft 28, roller bearings 42 similarly carry intermediate stub shaft 34, and roller bearings 43 similarly carry output shafts 40. Output shaft 40 is held from longitudinal movement in bushing 38 by a shoulder 44 thereon at one end and by washer 45 at its other end held in place by a center screw 46. A cover plate 47 is screwed into the opening 48 in the face of casing 16 through which the output shaft and its bearings are accessible. Dust guards 49, 50 and 51 for the shafts are shown. The casing 16 is advantageously formed in longitudinal sections 52 and 53 that are clampingly secured together by screw bolts 54 and 54a.

In accordance with the present invention, certain of the bolts that clamp the casing 16 sections together, in this instance the screw bolts 54a, are extended as at 55 beyond the rear face of the casing 16. Four of the seven clamping bolts are in the form of 54a with the rearward extension 55, for purposes of engagement with the novel adapter member of the present invention that will now be described in detail and that is given the numeral 56 as a whole.

Adapter member 56, as best seen in the perspective view of Fig. 7 and also as shown in the other figures, includes body 57, generally circular, that is centrally thickened as at 58 to provide a bearing element for the speed reducer output shaft 40 and also as a centering element for locating the adapter member in the opening 59 in the mounting plate 14 of the screw conveyor 11.

Screw threaded studs 60 for the adapter member extend through the mounting plate 14 with nuts 61 thereon on the inner face of the plate, the studs projecting from the outer face of the plate. The adapter member is peripherally shaped to conform generally to the arcuate periphery of the gear case 16 at its end housing the output shaft 40.

Following the present invention, there are three of the studs 60 defining a circle the center of which is the center of the opening 59 in the plate 14. The adapter member body 57 has three arcuate slots 62 therein that are elongated in the direction of the periphery of the adapter member. The slots 62 are spaced apart center to center 120° concentrically about the central bearing element 58 of the adapter member. The studs 60 extend through the elongated slots 62 respectively and nuts 63 and lock washers 64 are screwed on to the studs 60 from the outer face of the adapter member thus clamping the latter to the mounting plate 14.

Also on the outer face of the adapter member 56 are a pair of transversely elongated arms or bosses 65, on opposite sides of the center of the member. These bosses have inner ends 66 that are integral with the adapter body 57 and that are located adjacent each end respectively of one of the arcuate slots 62. The other ends of the bosses 65 overhang the adapter member body 57 as at 67 and the bosses diverge from their inner ends so that their overhanging ends or arms 67 overhang the other two arcuate slots 62 spaced therefrom respectively, the outer ends 67 of the bosses 65 being thus desirably farther apart than their inner ends.

The respective ends (both inner and outer) of the bosses 65 are tapped as at 68 to receive the screw threaded extensions 55 of the screw bolts 54a for mounting the speed reducer casing on the adapter member with the output shaft 40 of the speed reducer extending through the adapter member bearing element 58 and into the screw conveyor trough 11. Since the output shaft 40 is off center of the speed reducer with respect to the longitudinal axis of its casing 16, the latter being elongated to accommodate the offset input shaft 28 and intermediate stub shaft 34, the diverging arrangement of the overhanging ends or arms 67 of the bosses 66 tends to compensate for the off balance attachment of the speed reducer device to the adapter member, while, at the same time, the bosses, by reason of their overhanging ends, avoid interference with the nut-and-stud arrangements 63—60 for the elongated slots 62 that occur in the vicinity of the overhanging ends of the bosses as best seen in Fig. 6.

As described in said Firth patent hereinabove referred to, in the present instance the gear case 16 and with it the offset gearing carried by the input shaft 28 and stub shaft 34 is selectively rotatable about the axis of the output shaft 40, or, in other words, the output shaft and gear case are relatively rotatable on said axis. Since the drive pulley 30 is off center of that axis, as best seen in Fig. 2, the gear case may be rotated on said axis, clockwise or counterclockwise as the case may be. It may be rotated clockwise to tighten the belt 31 for driving purposes, or it may be temporarily rotated counterclockwise to permit easy installation of the driving belt before tightening thereof as described. In said patent, the common mounting plate for the gear reducer and the motor is shown arcuately slotted about the axis of the output shaft to permit said rotation. According to the present invention, however, the adapter member 56 is slotted as at 62 for that purpose as already described, thereby making it unnecessary to have the mounting plate 14 specially slotted. By here loosening nuts 63 the adapter and with it the gear case which is rigid with the adapter plate may be rotated on output shaft 40. Access is readily had to nuts 63 between bosses 65. When the selective rotation adjustment has been made, the nuts 63 are again tightened.

The adapter member also serves as a journal box for the gland 69 that is screwed into the adapter member as at 70 (Fig. 5) against a packing 71 for the output shaft 40, the gland 69 being desirably provided with circumspatial sockets 72 for the insertion of a lever bar (not shown) by which the gland may be rotated to loosen or tighten it in the threads 70.

So constructed and arranged, the speed reducer casing 16 may be readily removed from the adapter member 56 by unscrewing all four of the through bolts 54a. Before this is done, however, cross pins 73 which pass through both the conveyor driven shaft 13 and the output shaft 40 of the speed reducer, are removed, whereupon the speed reducer output shaft may be withdrawn both from the conveyor shaft 13 and from the bearing gland 69, which remains with the adapter member 56, thereby permitting ready accessibility to the gland 69 for maintenance or replacement without removing the adapter member from the mounting 14. This leaves the adapter member still securely mounted on the conveyor plate 14.

It will be apparent that the speed reducer output shaft 40 may provide the support for the conveyor shaft 13, and, that when the speed reducer is detached, as just described, the conveyor 12 may rest on the bottom of the trough 11 temporarily.

Before the speed reducer with its output shaft 40 is removed from the adapter member, as above described, the packing gland 69 is desirably loosened as by inserting a lever bar in one of its sockets 72 and rotating the gland counterclockwise, these sockets being readily accessible between the bosses or arms 67 for this purpose.

The invention is not intended to be limited to details of construction shown for purposes of exemplification, in accordance with the statute, and, furthermore, it may not be essential at all times that all features of the invention be used conjointly since various combinations or subcombinations may at times be advantageously employed. It is to be understood that such changes may be made, including modification or additions, as fall within the scope of the appended claims without departing from the invention.

What is here claimed is:

1. In mounting means, an adapter having a body portion, arcuately elongated slots in said body spaced apart about its perimeter, and a pair of transversely elongated diverging bosses on the face of said body portion, each of said bosses having an end where they diverge spaced from said face and overhanging one of said slots at said end, said body being apertured between said bosses to provide an opening therethrough, said slots being concentric with said opening.

2. The adapter of claim 1 wherein there are three said slots in said body, one of the slots being between the ends of the bosses that are not overhanging.

3. The adapter of claim 1 provided with tapped screw holes at each end of each boss respectively.

4. Mounting means, comprising in combination, a mounting plate, a plurality of at least three bolts rigid therewith defining a circle, an adapter member having at least three peripherally elongated slots therein receiving said bolts respectively, nuts on said bolts on the face of said adapter member, bosses on said adapter member each having an end spaced from the face of the adapter member and overhanging certain of said slots, respectively, and tapped screw holes in the ends of said bosses respectively, whereby a speed-reducing power transmission unit may be carried on said adapter member by screws passing through the unit and screwed into the holes in the bosses respectively.

5. The mounting means of claim 4 wherein the plate and the adapter member are apertured in register to provide an opening for passage of a power output shaft on the said unit.

6. The structure of claim 5 wherein the adapter member carries a removable packing gland in said opening.

7. Mounting means for power transmission unit including a casing and a mounting plate therefor, comprising, an adapter member for attachment to the mounting plate, means for selectively rotatively attaching the adapter member to the plate, integral transversely elongated bosses on the adapter member on opposite margins of the face thereof, means supportingly attaching the casing to each boss respectively, an opening through the adapter member, a packing gland carried by the adapter member in said opening, and means accessible between said bosses for rotating the packing gland without removing the casing from the adapter member.

8. The structure of claim 7 wherein the packing gland has a plurality of circumspatially arranged sockets therein for reception of a rotating tool.

References Cited in the file of this patent

UNITED STATES PATENTS

| | | |
|---|---|---|
| 2,514,461 | Voigt | July 11, 1950 |
| 2,812,054 | Dorris et al. | Nov. 5, 1957 |

UNITED STATES PATENT OFFICE
CERTIFICATE OF CORRECTION

Patent No. 2,925,740            February 23, 1960

Jackson Chung

It is hereby certified that error appears in the printed specification of the above numbered patent requiring correction and that the said Letters Patent should read as corrected below.

Column 2, line 9, for "relatively" read -- rotatively --.

Signed and sealed this 23rd day of August 1960.

(SEAL)
Attest:

KARL H. AXLINE
Attesting Officer

ROBERT C. WATSON
Commissioner of Patents